(12) United States Patent
Dunbar et al.

(10) Patent No.: US 6,215,620 B1
(45) Date of Patent: Apr. 10, 2001

(54) DATA STORAGE DISKETTE WITH MODIFIED HUB

(75) Inventors: William M. Dunbar, Cottage Grove; Leonard R. Swanson, Woodbury; Wayne L. Skelcher, Maplewood, all of MN (US); Peter Van Laanen, Boulder, CO (US)

(73) Assignee: Imation Corp., Oakdale, MN (US)

( * ) Notice: Subject to any disclaimer, the term of this patent is extended or adjusted under 35 U.S.C. 154(b) by 606 days.

(21) Appl. No.: 08/527,957

(22) Filed: Sep. 14, 1995

(51) Int. Cl.$^7$ .................................................. G11C 11/00
(52) U.S. Cl. ..................... 360/133; 360/99.01; 360/135
(58) Field of Search ............................. 360/133, 99.01, 360/135; 365/151

(56) References Cited

U.S. PATENT DOCUMENTS

| | | | |
|---|---|---|---|
| 4,488,191 | 12/1984 | Oishi et al. | 360/97 |
| 4,644,435 | 2/1987 | Nemoto et al. | 360/133 |
| 4,648,001 | 3/1987 | Komatsu et al. | 360/133 |
| 4,698,715 | 10/1987 | Oishi | 360/133 |
| 4,799,123 | 1/1989 | Kanazawa et al. | 360/133 |
| 4,814,926 | * 3/1989 | Gulbrandsen | 360/133 |
| 4,961,123 | 10/1990 | Williams et al. | 360/131 |
| 5,257,154 | 10/1993 | Sato | 360/135 |
| 5,265,086 | 11/1993 | Ota et al. | 369/284 |
| 5,383,078 | 1/1995 | Kato et al. | 360/133 |
| 5,444,651 | * 8/1995 | Yamamoto et al. | 365/108 |
| 5,462,823 | * 10/1995 | Evans et al. | 360/135 |

FOREIGN PATENT DOCUMENTS

| | | |
|---|---|---|
| 0 301 829 | 1/1989 | (EP) . |
| 0 620 259 A2 | 10/1994 | (EP) . |
| 3-245382 | 10/1991 | (JP) . |

OTHER PUBLICATIONS

Japan Industrial Standard Examination Council Deliberation, JIS X6227–1992, 90 mm Flexible Disk Cartridge—10 megabytes, Sector Servo, 33157 Magnetic Flux Inversion/Rad., Sep. 1, Heisei 4 (1992), published by Japan Standard Cooperative.

Hitachi Maxell specification, Sep. 10, 1991.

Japan Industrial Standard Examination Council Deliberation, JIS C6296–1987, 90 mm Flexible Disk Cartridge (7958 Magnetic Flux Inversion/rad), published by Japan Standard Cooperative.

\* cited by examiner

Primary Examiner—Sara Crane
(74) Attorney, Agent, or Firm—Eric D. Levinson

(57) ABSTRACT

A data storage diskette incorporates a hub having a reduced diameter. A circular sheet of magnetic media is mounted about the hub. The reduced diameter imparts added flexibility to inner regions of the sheet of magnetic media between the bond point of the sheet and a point at which magnetic heads access the sheet for data read and write operations. The added flexibility enables the sheet of magnetic media to more readily be bent to align with a gap defined by the magnetic heads. The enhanced alignment enables a read/write axis of the magnetic heads to be perpendicularly aligned with the sheet of magnetic media in the inner regions, thereby maintaining signal amplitude in such regions.

22 Claims, 1 Drawing Sheet

DATA STORAGE DISKETTE WITH MODIFIED HUB

FIELD OF THE INVENTION

The present invention relates generally to data storage diskette technology and, more particularly, to a hub for supporting a circular sheet of magnetic media in a data storage diskette.

DISCUSSION OF RELATED ART

Existing two-megabyte, three and one-half inch (89 mm) form factor data storage diskettes generally include a diskette housing, a circular hub mounted within the housing, a circular sheet of magnetic media mounted about the hub, one or more media access windows, and a shutter mechanism for covering and uncovering the media access windows. The hub includes a central hub member and a flange extending radially outward from the central hub member. The sheet of magnetic media has a circular aperture defining an inner diameter.

A portion of the sheet of magnetic media at the inner diameter is mounted on the flange of the hub such that the sheet is substantially centered about the central hub member. In existing two-megabyte, three and one-half inch (89 mm) data storage diskettes using magnetic media, the hub is sized to have an overall diameter of approximately 29.0 mm. Specifically, the central hub member has a diameter of approximately 24.9 mm, and the flange contributes approximately 4.1 mm to the overall hub diameter.

A portion of the hub extends through a circular aperture in the diskette housing. During read and write operations, a motor in the diskette drive turns the hub to rotate the sheet of magnetic media. The rotating sheet of magnetic media is accessed by opposing magnetic heads within the data storage diskette drive via the media access windows. Each of the magnetic heads performs read and write operations relative to one side of the sheet of magnetic media. The magnetic heads are aligned parallel to one another to define a small gap. The sheet of magnetic media extends into the gap and is held between the magnetic heads. The magnetic heads are translated radially across the sheet of magnetic media to access different regions of the sheet at which data is stored.

SUMMARY OF THE INVENTION

The present invention is directed to a hub for supporting a circular sheet of magnetic media, and to a data storage diskette incorporating such a hub. A hub and data storage diskette, in accordance with the present invention, may be used with sheets of magnetic media having conventional data storage capacities on the order of two megabytes, but are particularly useful with sheets of magnetic media configured for higher data storage capacities on the order of, for example, one-hundred and twenty megabytes. The higher data storage capacities may be realized, for example, by the use of optical tracking between the diskette drive and the sheet of magnetic media. An example of a data storage diskette using optical tracking is disclosed in U.S. Pat. No. 4,961,123.

In accordance with the present invention, the data storage diskette may comprise, for example, a diskette housing, the diskette housing conforming to a three and one-half inch (89 mm) diskette form factor, a sheet of magnetic media contained in the diskette housing, the sheet of magnetic media having a circular aperture, and a hub mounted in the diskette housing, the hub receiving a portion of the sheet of magnetic media such that the circular aperture of the sheet of magnetic media is substantially centered about the hub, wherein the hub has a diameter of less than approximately 29.0 mm.

The hub and data storage diskette of the present invention have been conceived in view of the discovery of a problem with the use of existing hubs in data storage diskettes having higher data storage capacities. The hub and data storage diskette of the present invention also have been conceived in view of identification of the source of the problem and, ultimately, the discovery of a solution to the problem. A description of the problem, source, and solution follows.

In general terms, the problem is inconsistent read-out amplitude along the entire radius of the sheet of magnetic media. In data storage diskettes configured for higher density data storage, data is stored in regions of the sheet of magnetic media located more closely to the inner diameter of the sheet, relative to existing two-megabyte diskettes. Storage of data more closely to the inner diameter helps add to the data storage capacity of the diskette. When magnetic heads are used to access regions of the sheet of magnetic media located near the inner diameter, however, the amplitude of signals read from such regions can significantly decrease. The decreased amplitude decreases the signal-to-noise ratio of the signal, and can potentially result in bit errors in the data read from the diskette.

The source of the decreased amplitude is a misalignment that occurs near the inner diameter between the gap defined by the magnetic heads and the sheet of magnetic media. The magnetic heads define a read/write axis that ideally is oriented perpendicular to the sheet of media at the point of the read/write operation. This perpendicular relationship should remain substantially constant as the magnetic heads are translated radially inward and outward across the sheet of magnetic media. In other regions, the sheet of magnetic media is flexible enough to undergo slight bending sufficient to preserve the perpendicular relationship. When the magnetic heads are disposed near the inner diameter, however, they are situated more closely to the point at which the sheet is bonded to the hub flange. The region of the sheet radius extending from the bond point to the magnetic heads is shorter, and tends to be less flexible than other regions. As a result, the regions near the inner diameter are not flexible enough to adequately align with the gap, and the perpendicular relationship between the read/write axis and the sheet is not satisfied.

The solution, in accordance with the present invention, is a modified hub. Specifically, the hub can be modified to have a smaller diameter than existing hubs. The hub diameter can be reduced by, for example, reducing the size of the hub flange. With a smaller diameter hub, the inner regions accessed by the magnetic heads are disposed further from the bond point of the sheet to the hub flange. The added distance between the bond point and the read/write access point enables the inner regions to be more flexible. The added flexibility enables the sheet of magnetic media to more readily be bent to align with the gap defined by the magnetic heads. The enhanced alignment enables the read/write axis to be perpendicularly aligned with the sheet of magnetic media in the inner regions, thereby maintaining signal amplitude in such regions.

In addition to enabling signal amplitudes to be maintained, the reduced hub diameter produces other advantages. For example, the reduced hub diameter results in a shorter flange. The shorter flange is structurally strengthened, enabling it to be constructed with a reduced thickness, if desired. The reduced thickness contributes to savings in the amount of material required to form the hub, and thus the cost of the hub. The reduced amount of material reduces the mass of the hub, enabling the hub to be rotated with less torque. Less torque requires less power from the motor, conserving battery resources in mobile computers. The reduced hub diameter also spaces the innermost data storage regions of the sheet of magnetic media further from the bonding point. The increased spacing reduces the contamination of the innermost data storage regions with defects resulting from bonding the sheet to the flange. As a result, data integrity in the innermost regions can be maintained. Further, the enhanced flexibility of the sheet near the inner diameter reduces wear on the sheet during use, resulting in increased durability.

DETAILED DESCRIPTION OF THE PREFERRED EMBODIMENTS

Figure 1:
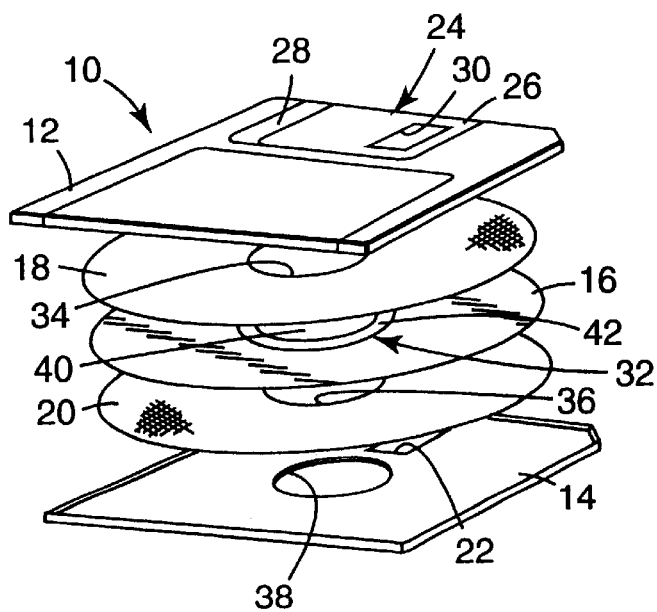
FIG. 1 is an exploded perspective view of an exemplary data storage diskette.

FIG. 1 is an exploded perspective view of an exemplary data storage diskette 10. The diskette 10 includes a diskette housing having a first half 12 and a second half 14. The diskette 10 conforms to a three and one-half inch (89 mm) diskette form factor. A circular sheet 16 of magnetic media is contained in the diskette housing. The sheet 16 of magnetic media is sandwiched between first half 12 and second half 14 of the diskette housing and is separated from the housing by fabric liners 18, 20.

Each of first half 12 and second half 14 includes a media access window. FIG. 1 shows, for example, a portion of a media access window 22 formed in second half 14. The fabric liners 18, 20 also include media access windows aligned with the media access windows formed in first half 12 and second half 14. Magnetic heads associated with a diskette drive into which diskette 10 is loaded access sheet 16 of magnetic media via the media access windows for data read and write operations.

The diskette 10 further includes a shutter mechanism 24 having first and second shutters for covering and uncovering the media access windows. FIG. 1 shows, for example, a first shutter 26 associated with first half 12 of the diskette housing. The first shutter 26 is movable within a recess 28 formed in first half 12. The first shutter 26 includes an aperture 30 that, when aligned with the media access window of first half 12, uncovers the media access window, allowing one of the magnetic heads to access sheet 16.

Figure 2:
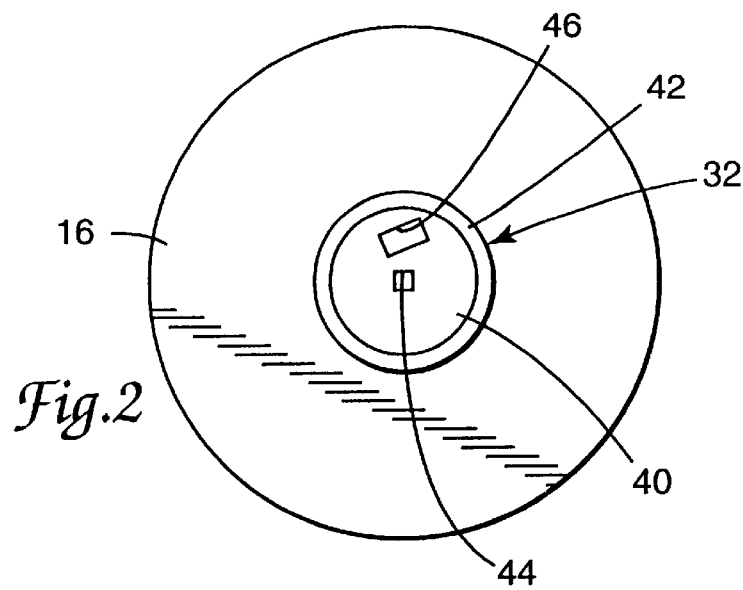
FIG. 2 is a plan view of a sheet of magnetic media mounted about a hub.

The sheet 16 of magnetic media is mounted about a circular hub 32. FIG. 2 is a plan view of sheet 16 mounted about hub 32. The sheet 16 includes a circular aperture defining an inner diameter. The fabric liners 18, 20 and second half 14 of the diskette housing similarly include circular apertures 34, 36, 38, respectively, substantially aligned with hub 32 and with the circular aperture of sheet 16. The hub 32 includes a central hub member 40 and a flange 42 extending radially outward from the central hub member. The central hub member 40 and flange 42 can be punched and formed from a single sheet of metal. A portion of sheet 16 at the inner diameter defined by the circular aperture is mounted on flange 42 such that the sheet is substantially centered about central hub member 40. The sheet 16 can be mounted on hub 32 with, for example, an adhesive.

When first half 12 and second half 14 are coupled together to enclose sheet 16 and fabric liners 18, 20, a portion of hub 32 extends through aperture 38 of the second half for engagement by a motor associated with the diskette drive. The motor engages apertures 44, 46, shown in FIG. 2, formed in central hub member 40. The motor turns hub 32 to rotate circular sheet 16 for data read and write operations about aperture 44. As sheet 16 is rotated, magnetic heads access the magnetic media at different points along the circumference of the circular sheet. The magnetic heads are translated radially during rotation of sheet 16 to also access the magnetic media at different points along the width of the circular sheet. Each of the magnetic heads reads from one side of sheet 16. The magnetic heads are aligned parallel to one another to define a small gap. The sheet 16 of magnetic media extends into the gap and is held between the magnetic heads.

If diskette 10 is configured for higher density data storage, it may be necessary to store data in regions of sheet 16 located closely to the inner diameter of the sheet. When the magnetic heads are used to access regions of sheet 16 located near the inner diameter, the amplitude of signals read from such regions can significantly decrease due to misalignment of sheet 16 with the gap defined by the magnetic heads. The decreased amplitude decreases the signal-to-noise ratio of the signal, and can potentially result in bit errors in the data read from the diskette.

The magnetic heads define a read/write axis that ideally is oriented perpendicular to sheet 16 at the point of the read/write operation. This perpendicular relationship should remain substantially constant as the magnetic heads are translated inward and outward along the radius of sheet 16. In most regions, sheet 16 is flexible enough to undergo slight bending sufficient to preserve the perpendicular relationship. When the magnetic heads are disposed near the inner diameter, however, they are situated more closely to the point at which sheet 16 is bonded to hub flange 42. The region of the sheet radius extending from the bond point to the magnetic heads is shorter, and tends to be less flexible than other regions. As a result, the regions near the inner diameter are not flexible enough to adequately align with the gap, and the perpendicular relationship between the read/write access and sheet 16 is not satisfied.

Figure 3:
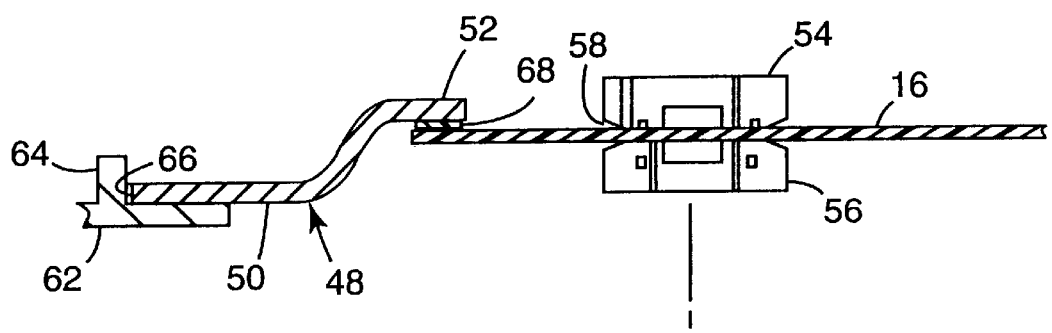
FIG. 3 is a cross-sectional side view of a hub supporting a sheet of magnetic media, in accordance with the present invention.

FIG. 3 is a cross-sectional side view of one-half of a hub 48 supporting a sheet 16 of magnetic media, in accordance with the present invention. For ease of illustration, FIG. 3 does not show the diskette housing that ordinarily would contain sheet 16. Like hub 32 of FIGS. 1 and 2, hub 48 includes a central hub member 50 and a hub flange 52. In accordance with the present invention, however, hub 48 of FIG. 3 is modified to have a smaller diameter than existing hubs. In particular, the overall diameter of hub 48 is less than approximately 29.0 mm.

As shown in FIG. 3, a pair of opposing magnetic heads 54, 56 within the diskette drive define a gap 58. The sheet 16 of magnetic media extends into gap 58 and is held between magnetic heads 54, 56. The magnetic heads 54, 56 define a read/write axis 60 that ideally is oriented substantially perpendicular to sheet 16. The magnetic heads 54, 56 can be translated along the radius of sheet 16 for data read and write operations. FIG. 3 further shows a portion 62 of a motor including a shaft 64 for engaging an aperture 66 in central hub member 50. Another shaft (not shown) associated with the motor engages another aperture in central hub member 50 for rotation of hub 48 about shaft 64.

The diameter of hub 48 can be reduced by reducing the size of central hub member 50, hub flange 52, or both. To enable hub 48 to be accessed uniformly by motors in existing diskette drives, however, the size of central hub member 50 preferably is not reduced significantly. Rather, hub flange 52 preferably is reduced in size to reduce the overall diameter of hub 48. With reduced-diameter hub 48, the inner regions accessed by magnetic heads 54, 56 are disposed further from a bond point 68 of sheet 16 to hub flange 52. The added distance between bond point 68 and the read/write axis 60 of magnetic heads 54, 56 enables the inner regions of sheet 16 to be more flexible. The added flexibility enables sheet 16 to more readily be bent to align with gap 58. The enhanced alignment enables read/write axis 60 of magnetic heads 54, 56 to be perpendicularly aligned with sheet 16 of magnetic media in the inner regions, thereby maintaining signal amplitude in such regions.

In addition to enabling signal amplitudes to be maintained, the reduced diameter of hub 48 produces other advantages. For example, the radial length of flange 52 extending outward from central hub member 48 can be reduced, resulting in a structurally strengthened flange. With added structural strength, flange 52 can to be constructed with a reduced thickness, if desired. The reduced thickness contributes to savings in the amount of material required to form hub 48, and thus the cost of the hub. The reduced amount of material can reduce the mass of hub 48, enabling the hub to be rotated with less torque. Less torque requires less power from the motor, conserving battery resources in mobile computers. The reduced diameter of hub 48 also spaces the innermost data storage regions of sheet 16 further from bonding point 68. The increased spacing reduces the contamination of the innermost data storage regions with defects resulting from bonding sheet 16 to flange 52. As a result, data integrity in the innermost regions of sheet 16 can be maintained. Further, the enhanced flexibility of sheet 16 near the inner diameter reduces wear on the sheet during use, resulting in increased durability.

The overall diameter of hub 48 is less than approximately 29.0 mm. To maximize the flexibility of sheet 16, it would be desirable to make flange 50 as short as possible. However, flange 50 should have at least a minimum length sufficient to provide a bonding surface for sheet 16. Thus, if the diameter of central hub member 48 is maintained at approximately 24.9 mm for access by existing drives, the overall diameter of hub 48, including flange 50, must be somewhat greater than approximately 24.9 mm. If a sufficient bonding surface is provided on flange 50, the overall diameter of hub 48 can be selected to fall anywhere in a range of less than approximately 29.0 mm and greater than approximately 24.9 mm.

As examples, the size of flange 50 may be selected such that the overall diameter of hub 48 falls in a first range of less than approximately 29.0 mm and greater than approximately 28.0 mm, a second range of less than approximately 28.0 mm and greater than or equal to approximately 26.9 mm, a third range of less than approximately 26.9 mm and greater than or equal to approximately 25.9 mm, or a fourth range of less than approximately 25.9 mm and greater than or equal to approximately 24.9 mm. The first, second, third, and fourth ranges are somewhat arbitrary, but correspond to reductions in the size of flange 50 by zero to twenty-five percent, twenty-five to fifty percent, fifty to seventy-five percent and seventy-five to one-hundred percent, respectively.

The flexibility of sheet 16 is enhanced when the size of flange 50 is reduced to fall in each of the above ranges. Thus, reductions in the size of flange 50 enable sheet 16 to more readily bend for alignment with gap 58. The flexibility of sheet 16 is more greatly enhanced, in particular, as the size of flange 50 is reduced. Thus, the flexibility of sheet 16 is greatest when the size of flange 50 is selected such that the overall diameter of hub 48 falls in the fourth range of less than approximately 25.9 mm to greater than approximately 24.9 mm. The flexibility is increased with reductions in the size of flange 50 because the reductions result in a greater distance between the bond point 68 and the point at which magnetic heads 54, 56 access sheet 16.

The inner diameter of sheet 16 of magnetic media can be mounted to flange 52 by, for example, adhesively bonding the sheet to the flange. One technique for adhesively bonding sheet 16 to flange 52 involves the use of a double-sided pressure-sensitive adhesive ring. The ring is sized to conform to at least a portion of flange 52, and therefore may vary in size with the overall diameter of hub 48. The ring may comprise a polyester carrier having a thickness on the order of 0.076 mm. A layer of pressure-sensitive adhesive having a thickness on the order of 0.038 mm can be carried by each side of the polyester carrier. The ring can be formed by applying a punch tool to an adhesive-polyester-adhesive sheet. One side of the ring is applied to flange 52 and sheet 16 is applied to the other side of the ring. The assembly is pressed together to form a bond between ring and flange 52 and between the ring and sheet 16. The thickness of the ring can be adjusted to control the datum between a bottom surface of hub 48 accessed by the motor and sheet 16.

A second technique for adhesively bonding sheet 16 to flange 50 involves the use of a liquid adhesive ring. According to this second technique, a UV-curable epoxy adhesive is applied to flange 52. After partially curing the adhesive with a UV light source, sheet 16 and hub 48 are pressed together and the adhesive is allowed to set. Examples of a suitable UV-curable epoxy adhesive are disclosed in European Published Patent Publication No. 0 620 259 A2.

What is claimed is:

1. A data storage diskette comprising:
   a diskette housing, the diskette housing conforming to a three and one-half inch (89 mm) diskette form factor;
   a sheet of magnetic media contained in the diskette housing, the sheet of magnetic media having a circular aperture; and
   a hub mounted in the diskette housing, the hub including a central hub member and a hub flange that extends radially outward from the central hub member, wherein a portion of the sheet of magnetic media is mounted on the hub flange, and
   wherein the hub has a diameter of less than 29.0 mm.

2. The data storage diskette of claim 1, wherein the central hub member has a diameter of 24.9 mm.

3. The data storage diskette of claim 2, wherein the hub has a diameter that is greater than 24.9 mm.

4. The data storage diskette of claim 2, wherein the hub has a diameter that is greater than or equal to 28.0 mm.

5. The data storage diskette of claim 2, wherein the hub has a diameter that is less than 28.0 mm and greater than or equal to 26.9 mm.

6. The data storage diskette of claim 2, wherein the hub has a diameter that is less than 26.9 mm and greater than or equal to 25.9 mm.

7. The data storage diskette of claim 2, wherein the hub has a diameter that is less than 25.9 mm and greater than or equal to 24.9 mm.

8. The data storage diskette of claim 1, wherein the sheet of magnetic media has a data storage capacity of at least one-hundred and twenty megabytes.

9. A hub for supporting a sheet of magnetic media having a circular aperture, wherein the sheet of magnetic media conforms to a three and one-half inch (89 mm) diskette form factor, the hub including a central hub member and a hub flange extending radially outward from the central hub member, wherein a portion of the sheet of magnetic media is mounted on the hub flange, and wherein the hub has a diameter of less than 29.0 mm.

10. The hub of claim 9, wherein the central hub member has a diameter of 24.9 mm.

11. The hub of claim 10, wherein the hub has a diameter that is greater than 24.9 mm.

12. The hub of claim 10, wherein the hub has a diameter that is greater than or equal to 28.0 mm.

13. The hub of claim 10, wherein the hub has a diameter that is less than 28.0 mm and greater than or equal to 26.9 mm.

14. The hub of claim 10, wherein the hub has a diameter that is less than 26.9 mm and greater than or equal to 25.9 mm.

15. The hub of claim 10, wherein the hub has a diameter that is less than 25.9 mm and greater than or equal to 24.9 mm.

16. A data storage diskette comprising:
   a diskette housing, the diskette housing conforming to a three and one-half inch (89 mm) diskette form factor;
   a sheet of magnetic media contained in the diskette housing, the sheet of magnetic media having a circular aperture, and the sheet of magnetic media having a data storage capacity of at least one-hundred and twenty megabytes and optical servo tracking for control of a data storage diskette drive for accessing the sheet of magnetic media; and
   a hub mounted in the diskette housing, the hub including a central hub member and a hub flange extending radially outward from the central hub member, wherein a portion of the sheet of magnetic media is mounted on the hub flange, and
   wherein the hub has a diameter of less than 29.0 mm, the sheet of magnetic media thereby being made more flexible for communication with magnetic heads of the data storage diskette drive.

17. The data storage diskette of claim 16, wherein the central hub member has a diameter of 24.9 mm.

18. The data storage diskette of claim 17, wherein the hub has a diameter that is greater than 24.9 mm.

19. The data storage diskette of claim 17, wherein the hub has a diameter that is greater than or equal to 28.0 mm.

20. The data storage diskette of claim 17, wherein the hub has a diameter that is less than 28.0 mm and greater than or equal to 26.9 mm.

21. The data storage diskette of claim 17, wherein the hub has a diameter that is less than 26.9 mm and greater than or equal to 25.9 mm.

22. The data storage diskette of claim 17, wherein the hub has a diameter that is less than 25.9 mm and greater than or equal to 24.9 mm.

* * * * *